United States Patent [19]

Brown

[11] 4,349,126

[45] Sep. 14, 1982

[54] SUBSTRATE DISPENSING APPARATUS

[75] Inventor: William L. Brown, Easton, Pa.

[73] Assignee: SI Handling Systems, Inc., Easton, Pa.

[21] Appl. No.: 209,244

[22] Filed: Nov. 21, 1980

[51] Int. Cl.³ .............................................. B65G 59/00
[52] U.S. Cl. .................................... 221/112; 221/119; 221/129; 221/126; 221/130; 221/131; 271/9; 271/150
[58] Field of Search ............... 221/129, 236, 191, 193, 221/194, 195, 76, 112, 119, 120, 124, 126, 130, 131; 198/575, 601, 602, 605, 607; 414/134–136, 124, 112, 130

[56] References Cited

U.S. PATENT DOCUMENTS

| | | | |
|---|---|---|---|
| 2,733,833 | 2/1956 | Skillman | 221/119 X |
| 3,032,338 | 5/1962 | Anderson et al. | 271/9 UX |
| 3,759,509 | 9/1973 | Peterson | 271/150 |
| 3,966,193 | 6/1976 | Storace et al. | 271/150 |
| 4,129,229 | 12/1978 | Brown | 221/129 |

FOREIGN PATENT DOCUMENTS 912215 12/1962 United Kingdom ................... 271/9

Primary Examiner—Allen N. Knowles
Attorney, Agent, or Firm—Seidel, Gonda, Goldhammer & Panitch

[57] ABSTRACT

Dispensing apparatus for dispensing articles such as thin substrates includes horizontally disposed shelves one above the other. Each shelf is divided into a plurality of lanes. Each lane includes at least one endless belt for moving a stack of upright substrates toward a front edge of the shelf. A drive mechanism is connected to each belt for driving each belt. A transfer member is provided for each lane adjacent the front end portion of the shelf. Each transfer member projects beyond the effective reach of its associated belt so that the leading substrate to be dispensed is supported by the transfer member prior to dropping downwardly off the free end of the transfer member.

9 Claims, 3 Drawing Figures

2

SUBSTRATE DISPENSING APPARATUS

BACKGROUND OF THE INVENTION

The present invention is an improvement over the apparatus disclosed in U.S. Pat. No. 4,129,229. The apparatus disclosed in said patent has performed satisfactorily with various types of articles. I have found that certain types of articles cannot be reliably dispensed by the apparatus disclosed in said patent wherein the articles are pushed fowardly by a pusher. Thus, a problem has developed in dispensing articles which are thin and in the form of a substrate such as an envelope containing greeting cards, books, phonograph records, tape cassettes, etc. Another type of article which is difficult to dispense with apparatus in accordance with the prior art are articles which are in the form of a substrate but are compressible to some extent such as sponges, paper products, etc.

The present invention is directed to a solution of the problem of how to reliably control the dispensing of thin substrates having a thickness as small as $\frac{1}{8}$ of an inch. The present invention also provides a solution to the problem of how to dispense articles which are compressible and cannot be reliably dispensed by pushing on the last article in a lane as taught by the above mentioned patent.

SUMMARY OF THE INVENTION

The present invention is directed to apparatus for dispensing substrates and includes at least one horizontally disposed shelf. The shelf is divided into a plurality of lanes. Each lane has a means including at least one endless belt for moving a stack of upright substrates in contact therewith toward a front edge of the shelf.

A shaft is supported adjacent the front edge of the shelf. A roller on the shaft is provided and the belt extends around the roller. A drive means is connected to the shaft for rotatably driving the shaft which in turn moves the belt. The belt causes substrates in contact therewith to move toward the front edge of the shelf.

A transfer member is provided for each lane and supported by the front edge portion of the shelf. Each transfer member projects beyond the effective reach of its associated belt so that the leading substrate to be dispensed is supported by the transfer member prior to dropping downwardly off a free end of the transfer member when pushed by the next succeeding substrate.

It is an object of the present invention to provide apparatus for dispensing thin substrates in a reliable and controllable manner.

It is another object of the present invention to provide apparatus for dispensing articles which are compressible in a reliable and controllable manner.

It is an object of the present invention to provide apparatus for dispensing articles from a shelf in a manner which does not rely on pushing the last article in a lane but relies on moving each article simultaneously due to contact with an endless belt.

It is another object of the present invention to provide an article dispensing apparatus for automatically dispensing articles from shelves onto a conveyor as they are picked whereby the articles may be packed or otherwise processed in the order in which they are picked.

It is another object to provide apparatus for dispensing articles which cannot reliably be dispensed by being pushed off the shelf by a pusher arm.

Other objects will appear hereinafter.

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

Figure 1:
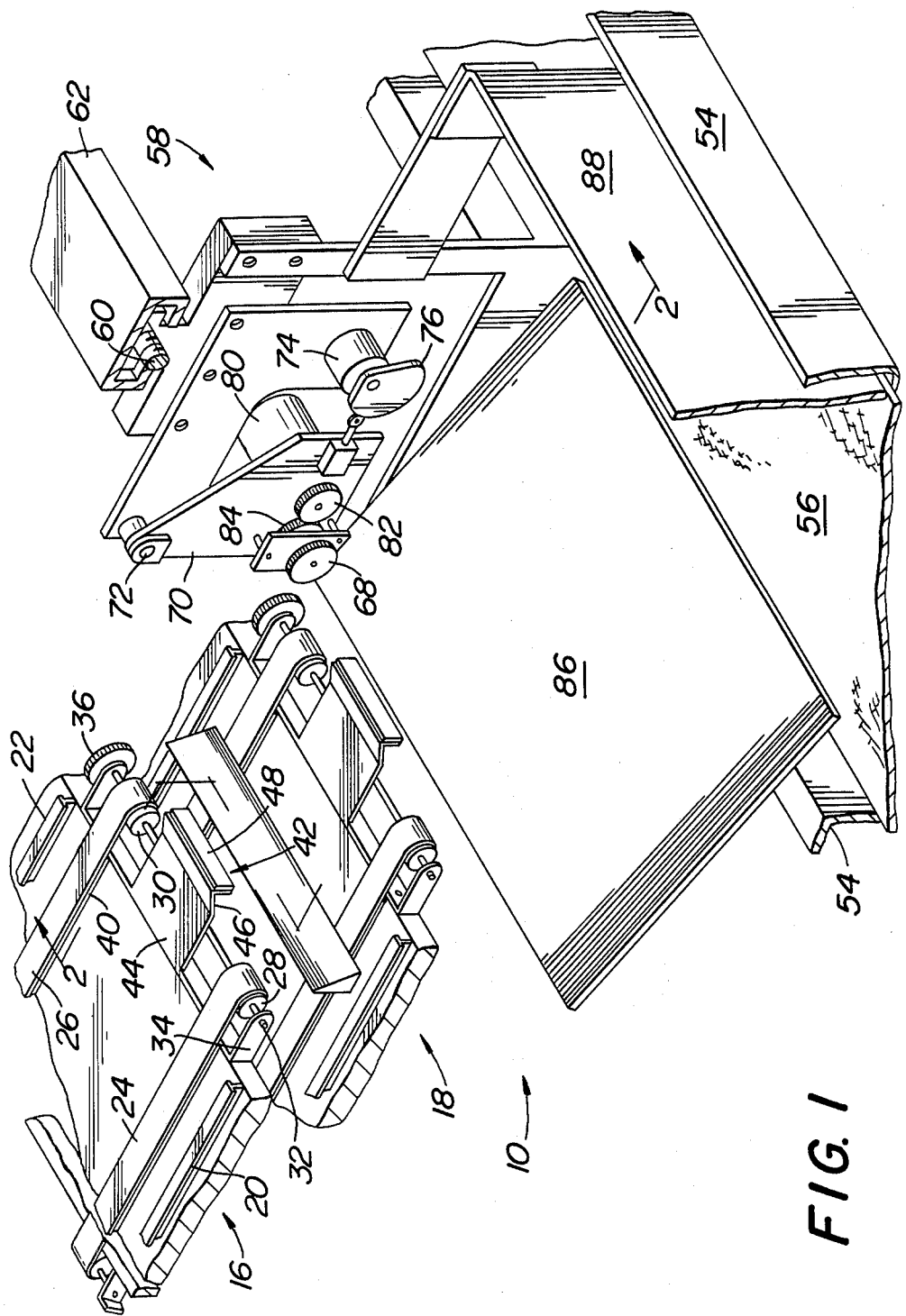
FIG. 1 is a partial perspective view of apparatus in accordance with the present invention.

Referring to the drawing in detail, wherein like numerals indicate like elements, there is shown apparatus in accordance with the present invention designated generally as 10. The apparatus 10 includes one or more shelves as will be described hereinafter and a picking head of the type disclosed in said U.S. Pat. No. 4,129,229.

The apparatus 10 includes means for supporting articles to be dispensed including a housing 12 having a plurality of horizontally disposed shelves one above the other. For purposes of illustration only three such shelves are illustrated and designated 14, 16 and 18. The shelves are identical. Hence, the relationship of the picking head with only shelf 16 will be described in detail.

The shelf 16 is divided into a plurality of parallel lanes by means of lane dividers 20, 22, etc. The lane dividers are generally T-shaped in section as will be apparent from FIG. 1 and are removably bolted to the shelf 16 in any conventional manner. The width of one lane may vary with respect to the width of another lane. That is, the transverse distance between the lane dividers 20-22 is variable depending upon the width of the articles to be dispensed.

At least one, and preferably two endless belts are associated with each lane. As illustrated, belts 24 and 26 are provided between the lane dividers 20, 22. The top run of belts 24, 26 overlies the upper surface of shelf 16 while the bottom run of the belts is juxtaposed to the bottom surface of shelf 16. Belt 24 extends around a roller 28 secured to shaft 32. Belt 26 extends around a roller 30 secured to shaft 32. The diameter of rollers 28, 30 approximates the thickness of shelf 20. The rear end of the endless belts extend around similar rollers supported in a similar manner at the rear end of the shelf whereby the width of the shelf is narrower than the length of the endless loop of the belts.

Figure 3:
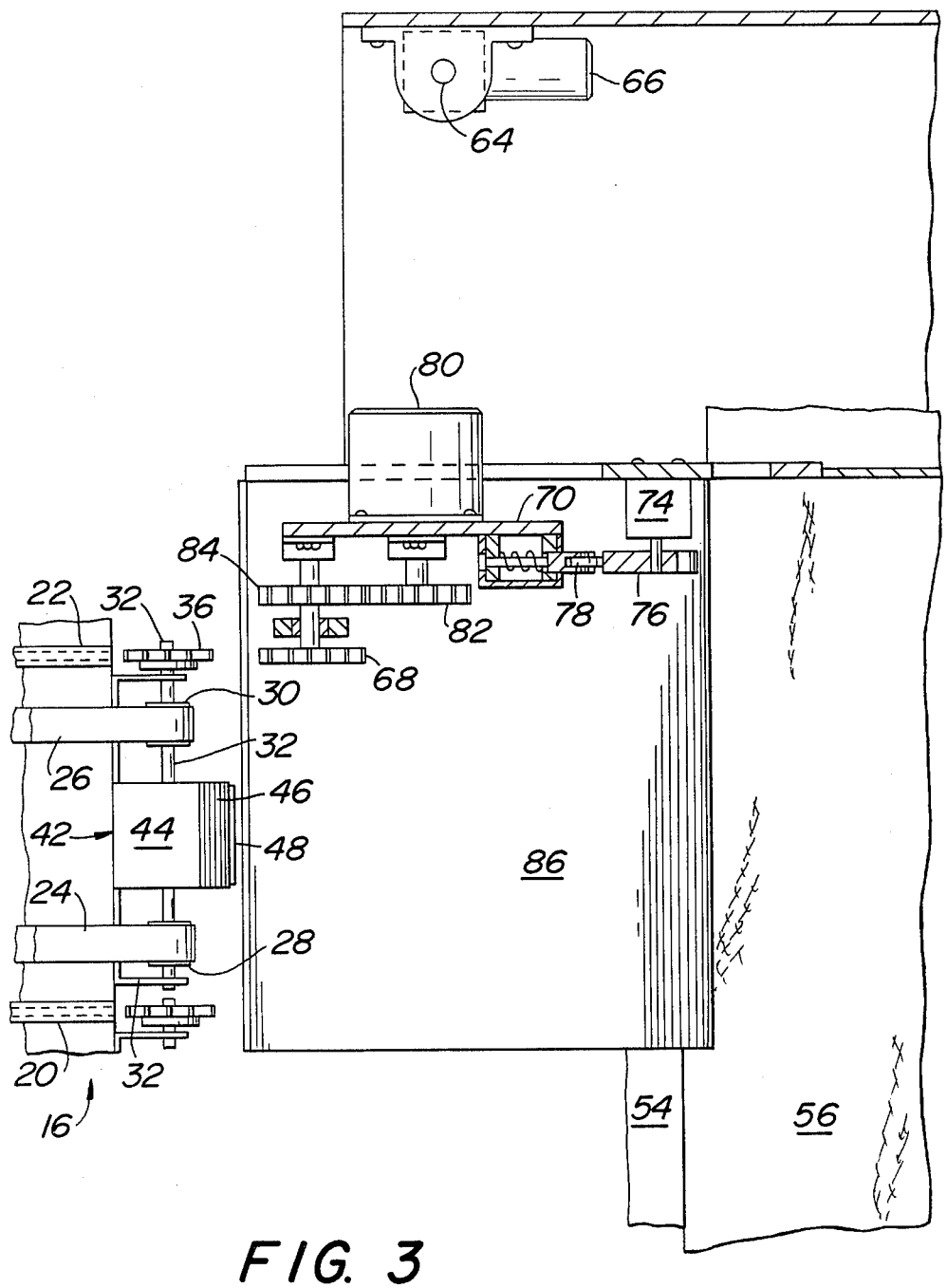
FIG. 3 is a sectional view taken along the line 3—3 in FIG. 2.

A bracket 34 is removably connected to the front end portion of the shelf 16 in any convenient manner. The bracket 34 may be one integral bracket or a pair of separate L-shaped brackets so that shaft 32 is rotatably supported about a horizontal axis parallel to and spaced from the front edge of the shelf 16 as shown in FIG. 1. A drive means is connected to shaft 32 for rotatably driving the shaft 32 and the rollers 28, 30 so as to cause the upper run of the belts 24, 26 to move from left to right in the figures of the drawings. Such drive means is preferably a gear or sprocket 36 fixedly secured to the shaft 32 at a location so as to be approximately aligned with the lane divider 22. See FIG. 3.

A spacer 38 is provided between the top run of belt 24 and the top surface of shelf 16. A spacer 40 is provided between the top run of the belt 26 and the top surface of the shelf 16. Spacers 38 and 40 are preferably thin strips of self lubricating material such as self lubricating plastics. Belts 24 and 26 are preferably provided with a roughened outer surface so as to be a high friction surface. The spacers 38, 40 prevent sliding contact between the top runs of the belts 24, 26 and the top surface of the shelf 16.

A transfer member 42 is fixedly secured to the front end portion of the shelf 16 in any convenient manner. As illustrated, transfer member 42 may be integral with the bracket 34 but if desired may be separate from the bracket 34. The transfer member 42 projects forwardly with respect to the reach of belts 24, 26 as shown more clearly in FIGS. 2 and 3 and includes a horizontal portion 44 connected to an upwardly angled portion 46. Portion 46 terminates in a vertically disposed downwardly directed flange having a reflector 48 attached thereto. As shown more clearly in FIG. 2, at least the leading one of the substrates 52 will be supported by the portion 46 of the transfer member 42 out of the effective zone of influence of the belts 24, 26. The substrates 52 are preferably stacked on edge so as to be upright and leaning slightly to the rear toward a backstop 50. Backstop 50 rides on the belts 24, 26 and is pulled along with the side edge of each of the substrates 52 by the belts toward the front edge of the shelf 16.

A frame 54 is provided in front of the shelves 14, 16 and 18. The shelves 14, 16 and 18 are of the same length. A frame 54 is of sufficient length so that an endless conveyor 56 supported thereby may receive articles from each lane on each of the shelves 14, 16 and 18. Hence, the endless conveyor 56 has a length which is at least as long as the length of the shelves 14, 16 and 18 while being mounted for movement in a direction whih is perpendicular to the lanes on the shelves.

A picking head 58 is supported by the frame 54 for vertical movement therewith as the frame 54 and endless conveyor 56 are moved vertically to the elevation of the various shelves 14, 16 and 18. Also, the picking head 58 is supported for horizontal movement along the conveyor 56 whereby the picking head 58 may be directed to each of the lanes on each of the shelves. Any one of a variety of different mechanisms may be utilized to selectively cause the picking head 58 to move horizontally along the frame 54. As shown, the picking head 28 has a threaded nut coupled to a threaded shaft 60 and is guided for movement along the frame 54 by a channel 62. Shaft 60 is preferably driven by a reversible pulse motor whereby a predetermined number of pulses will position the picking head 58 at a preselected position along the frame 54 so that it may operate to cause dispensing along any predetermined one of the lanes on any predetermined one of the shelves.

The frame 54 is guided for vertical movement at its ends and is adapted to be elevated in any convenient manner. As illustrated, vertically disposed threaded shafts 64 are coupled to the ends of the frame 54. A pulse motor 66 is provided to turn all of the shafts 64 so that the frame 54 may be moved vertically to preselected elevations whereby the picker head 58 will be at a proper elevation with the conveyor 56 slightly below the elevation of the preselected shelf.

The picking head 58 has a gear 68 adapted to mesh with and drive gear 36 in a direction so as to cause the belts 24, 26 to move from left to right in the figures of the drawings. Gear 68 is rotatably supported by a vertically disposed plate 70. Plate 70 is supported from the picking head frame by pin 72 whereby plate 70 and its associated gear 68 may pivot through an arc toward and away from the gear 36.

A means is provided for pivoting plate 70 toward the gear 36. Such means includes a rotary solenoid 74 supported by the picking head frame. A cam segment 76 is connected to the output of solenoid 74 and adapted to be caused to rotate in the direction of the arrow superimposed thereon in FIG. 2. A cam follower 78, spring biassed into contact with cam 76, is supported by plate 70 for movement therewith. A variable speed motor 80 is supported by plate 70 for driving a gear 82. Gear 82 is meshed with gear 84. Gear 68 and 84 are fixedly secured to the same shaft.

A sloping panel 86 is supported by the picking head frame for movement therewith. The upper edge of panel 86 is at an elevation slightly below the elevation of the reflector 48. The lower edge of panel 86 is slightly above the elevation of the top run of conveyor 56. A vertical back-up panel 88 is supported by the picking head frame at a location spaced from the lower edge of the panel 86. The back-up panel 88 is parallel with respect to a vertical plane containing the front edge of the shelves 14, 16 and 18. See FIGS. 1 and 2. The lower edges of panels 86, 88 are parallel to one another. The lefthand end of conveyor 56 is preferably pivotably coupled to one end of an endless conveyor as described in the above mentioned patent. As articles are picked by the picking head 58, they are continuously and sequentially moved to a packing area in the same order that they were picked. In this manner, checking of the articles against an invoice or a list is more rapidly accomplished as compared with simultaneous delivery of all picked articles with a random sequence.

The apparatus of the present invention is utilized as follows. Each of the lanes is provided with articles to be dispensed in the form of thin substrates 52 having a thickness of at least ⅛ of an inch and up to about 1 inch. The substrates 52 may be difficult to dispense due to their sponginess or may be difficult to dispense because of their thiness but are easily and reliably dispensed by the present invention.

Figure 2:
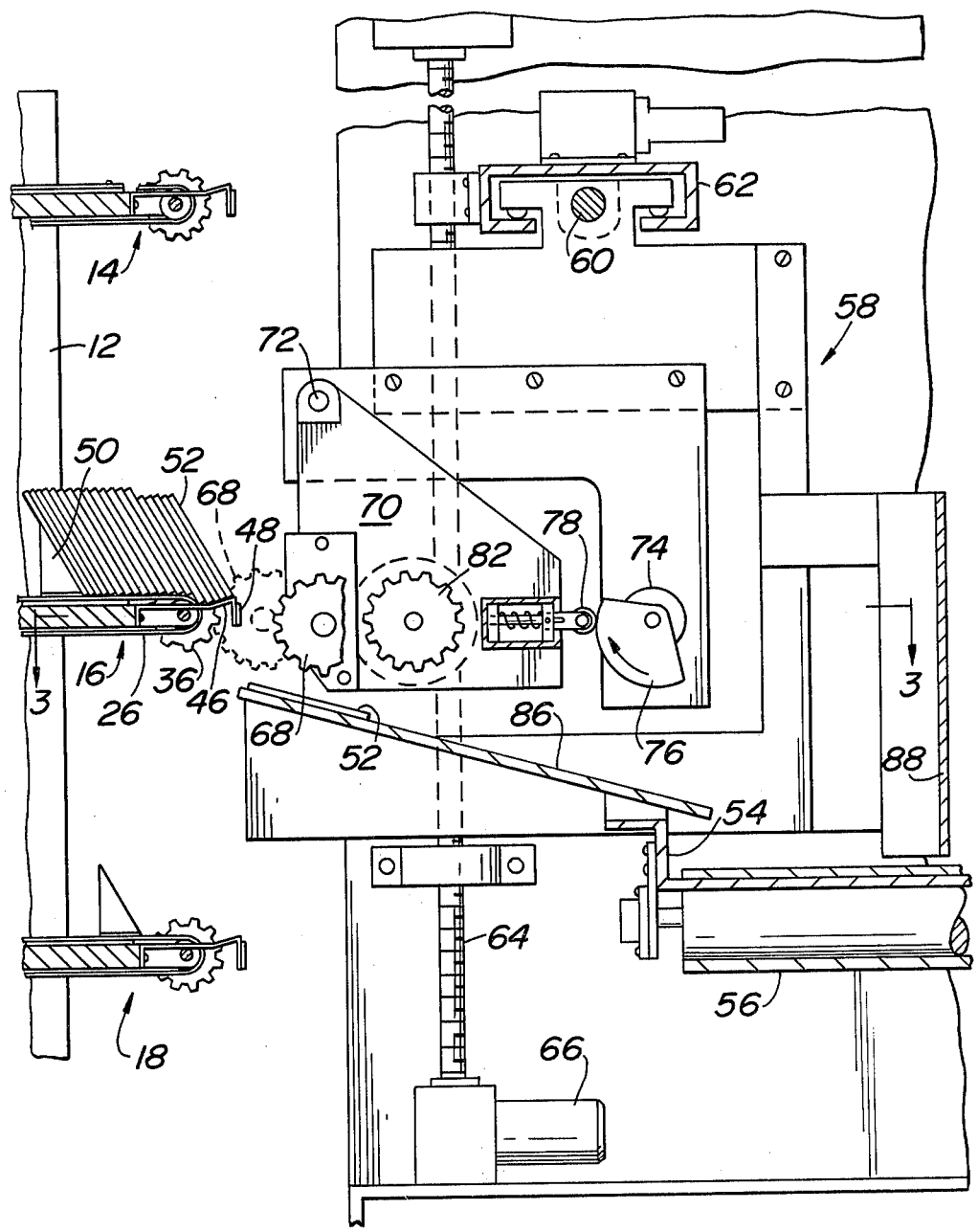
FIG. 2 is a sectional view taken along the line 2—2 in FIG. 1.

A back stop 50 overlies the belt or belts in each of the lanes. The substrates are stacked upright and leaning rearwardly as shown in FIG. 2. Input instructions are coupled to the picking head 58 to cause it to sequentially move to a predetermined position whereby its gear 68 will be opposite a gear 36 at the predetermined lane. Input instructions to the picking head 58 may be accomplished manually with teletype inputs, semi-automatically with a numerically punched system, or automatically with a computer hookup. When the gear 68 is opposite the predetermined gear 36, solenoid 74 rotates cam 76 to pivot plate 70 about pin 72 until gear 68 meshes with gear 36. Gear 68 is driven by the motor 80 in a predetermined direction so as to cause the belts 24, 26 to move toward the front edge of the shelf.

As the stack of substrates 52 is moved forwardly, at least the leading substrate 52 will lose contact with the belts 24, 26 and be supported solely by the transfer member 42. The inclined portion 46 of member 42 prevents inadvertant uncontrolled sliding of the leading substrate 52 off the member 42. The leading substrate 52 is pushed by substrates therebehind until it drops off the free end of the transfer member 42.

As the substrate 52 being dispensed drops downwardly off the free end of the transfer member 42, the substrate will interrupt a light beam from a photocell on picking head 58 and aimed at the reflector 48. Interruption of the light beam will trigger a stop signal for motor 84 and solenoid 74. If it is desired to dispense two substrates from the same lane, the process will continue until the light beam aimed at reflector 48 has been interrupted twice. Otherwise, motor 80 will stop and solenoid 74 will return to the position shown in FIG. 2. Plate 70 pivots back to the position shown in FIG. 2 with gear 68 losing contact with gear 36. The substrate 52 which has been dispensed will slide down the inclined plate 86 onto the conveyor 56.

During a dispensing of a substrate, it will be noted that the substrate moves slightly upwardly due to the incline of portion 46 on the transfer member 42. The inclined portion 46 assures that the substrates 52 will drop one at a time and provides sufficient area so that substrates which have been compressed will decompress before being dispensed.

The present invention may be embodied in other specific forms without departing from the spirit or essential attributes thereof and, accordingly, reference should be made to the appended claims, rather than to the foregoing specification, as indicating the scope of the invention.

I claim:

1. Apparatus for dispensing substrates comprising at least one horizontally disposed shelf, means supporting said shelf, means dividing the shelf into a plurality of lanes, each such lane having means including at least one endless belt for moving a stack of upright substrates thereabove and in contact therewith toward a front edge of the shelf, a shaft adjacent the front edge of the shelf, a roller on the shaft and around which the belt extends, drive means connected to the shaft for rotatably driving the shaft which in turn moves said belt to cause substrates in contact therewith to move toward the front edge of the shelf, a motor means for selectively driving said drive means, a transfer member for each lane, each transfer member being supported by the front end portion of the shelf, each transfer member projecting beyond the effective reach of its associated belt so that the leading substrate to be dispensed is supported by said transfer member prior to dropping downwardly off a free end of said transfer member when pushed by the next succeeding substrate.

2. Apparatus in accordance with claim 1 including a pair of endless belts associated with each lane, each belt having a top run overlying an upper surface of the shelf and a bottom run juxtaposed to a bottom surface on the shelf, said transfer member being between said belts at the front edge of the shelf.

3. Apparatus in accordance with claim 1 wherein the transfer member has a portion inclined upwardly toward a free end, and a reflector supported by the free end of said transfer member.

4. Apparatus in accordance with claim 1 wherein each belt has a high friction surface for contact with substrates and is spaced from the top surface of the shelf by a spacer having a smooth surface in contact with the belt.

5. Apparatus in accordance with claim 1 wherein said motor means for driving said drive means includes a picking head supported for vertical movement with a horizontal conveyor and for independent movement horizontally along the conveyor generally parallel to the front edge of said shelf.

6. Dispensing apparatus comprising an endless belt supported at its ends by rollers mounted for rotation about horizontal axes, a shelf extending between the upper and lower runs of said belt, means between the top run of the belt and the top surface of the shelf for reducing friction therebetween, a shaft adjacent and parallel to the front edge of the shelf, a roller on the shaft around which the belt extends, drive means connected to the shaft for rotatably driving the shaft which in turn moves said belt to cause articles in contact therewith to move toward the front edge of the shelf, a transfer member supported by the front end portion of the shelf and projecting therebeyond for a sufficient distance so as to be beyond the reach of said belt, said transfer member being inclined upwardly toward a free end from which articles to be dispensed may be dropped downwardly.

7. Apparatus for dispensing thin articles which are spongy or deformable comprising a plurality of horizontally disposed shelves one above the other, means dividing the top surface of each shelf into a plurality of parallel lanes, each lane having means for moving a stack of articles toward a front edge of the shelf including a pair of endless belts supported by each shelf, each shelf extending between the upper and lower runs of the belts associated therewith, drive means connected to the belts for moving the belts in a direction so as to cause articles in contact with the upper run of the belts to be moved toward the front edge of the shelf, a transfer member for each lane between the belts in each lane, each transfer member being supported so as to project beyond the effective range of the belts so that the leading substrate is out of contact with the belts, and means supporting a reflector adjacent a free end of said transfer member.

8. Apparatus in accordance with claim 7 wherein the transfer member has a portion inclined upwardly toward its free end, and said reflector being supported by a flange at the free end of said transfer member.

9. Apparatus in accordance with claim 7 wherein each belt has a high friction outer surface for contact with substrates and is spaced from the top surface of the shelf by a spacer having a smooth surface in contact with an inner surface of the belt.

* * * * *